United States Patent
Meriac et al.

(10) Patent No.: US 10,579,418 B2
(45) Date of Patent: Mar. 3, 2020

(54) MANAGEMENT OF CONTROL PARAMETERS IN ELECTRONIC SYSTEMS

(71) Applicant: ARM IP Limited, Cambridge (GB)

(72) Inventors: Milosch Meriac, Cambridge (GB); Alessandro Angelino, London (GB)

(73) Assignee: ARM IP LIMITED, Cambridge (GB)

( * ) Notice: Subject to any disclaimer, the term of this patent is extended or adjusted under 35 U.S.C. 154(b) by 173 days.

(21) Appl. No.: 15/653,095

(22) Filed: Jul. 18, 2017

(65) Prior Publication Data

US 2018/0039510 A1    Feb. 8, 2018

(30) Foreign Application Priority Data

Aug. 5, 2016    (GB) .................................. 1613514.7

(51) Int. Cl.
*G06F 9/48*    (2006.01)
*G06F 9/50*    (2006.01)

(52) U.S. Cl.
CPC .......... *G06F 9/4831* (2013.01); *G06F 9/5055* (2013.01)

(58) Field of Classification Search
CPC .................................................... G06F 9/4831
See application file for complete search history.

(56) References Cited

U.S. PATENT DOCUMENTS

| | | | |
|---|---|---|---|
| 9,639,370 B1 * | 5/2017 | Gschwind | G06F 9/3844 |
| 2003/0023774 A1 | 1/2003 | Gladstone et al. | |
| 2007/0136403 A1 * | 6/2007 | Kasuya | G06F 9/461 |
| 2008/0225621 A1 * | 9/2008 | Yoshimi | G06F 9/461 365/227 |
| 2010/0110083 A1 * | 5/2010 | Paltashev | G06F 9/30072 345/506 |
| 2011/0099554 A1 * | 4/2011 | Shafi | G06F 11/3664 718/108 |
| 2011/0246970 A1 * | 10/2011 | Ganai | G06F 11/3608 717/132 |
| 2016/0224397 A1 | 8/2016 | Arora et al. | |

OTHER PUBLICATIONS

Search Report dated Jan. 13, 2017 for Great Britain Application No. GB1613514.7, 4 pages.

* cited by examiner

*Primary Examiner* — Sisley N Kim
(74) *Attorney, Agent, or Firm* — Patterson Thuente Pedersen, P.A.

(57) ABSTRACT

The machine implemented method for operating at least one electronic system comprises detecting a pattern of use of plural control parameters in a path through a graph of operational context switches to reach a target operational context; storing a representation of the pattern in association with an indicator identifying the target operational context; responsive to detecting at least one of a request for a switch of operation from a source operational context to the target operational context, a trapping on a resource access, and a detection of a breakpoint, retrieving the representation in accordance with the indicator identifying the target operational context; and responsive to the retrieving, applying at least one control parameter to said at least one electronic system to match the pattern.

15 Claims, 3 Drawing Sheets

MANAGEMENT OF CONTROL PARAMETERS IN ELECTRONIC SYSTEMS

RELATED APPLICATION

The present application claims priority to GB Application No. 1613514.7 filed Aug. 5, 2016, which is hereby incorporated herein in its entirety by reference The present technology relates to methods and apparatus for operating electronic systems to manage the application of control parameters across device or program operational context switches.

In many electronic systems, control parameters (for example, hardware or software register or memory settings) need to be managed to achieve suitable processor performance, economy of memory use, detection of anomalies indicating potential problems (such as the presence of malware in the system) and optimal processing flow between and among processes and devices. The need to apply various types of control parameter differs according to the hardware or software context at any point in the execution flow.

In a first approach, the described technology provides a machine implemented method for operating at least one electronic system, comprising detecting a pattern of use of plural control parameters in a path through a graph of operational context switches to reach a target operational context; storing a representation of the pattern in association with an indicator identifying the target operational context;

responsive to detecting at least one of a request for a switch of operation from a source operational context to the target operational context, a trapping on a resource access, and a detection of a breakpoint, retrieving the representation in accordance with the indicator identifying the target operational context; and responsive to the retrieving, applying at least one control parameter to the at least one electronic system to match the pattern.

As stated above, the need to apply various types of control parameter differs according to the hardware or software context at any point in the execution flow. For example, a purely input-receiving context needs to apply those control parameters that configure attached input devices, but has no need to apply control parameters to configure output devices. In the same way, for example, memory reservations for specific purposes may differ from operational context to operational context.

Considering the execution flows of an electronic system as directed graphs having nodes (or vertices) representing hardware and software operational contexts and paths (or edges) representing the switches from source contexts to target contexts, each node having differing control parameter requirements, there will often be repeating patterns of control parameter use associated with particular execution flow paths between operational contexts. If information about these patterns of use of control parameters is stored in a way that associates the use patterns of control parameters with the nodes in the graph, knowledge of repeating patterns may be accumulated and used to manage subsequent actions in the operation of the electronic system.

For example, where a large access control list (ACL) is distributed widely in a system to the system's component programs and devices, it will typically contain a large number of entries, not all of which will be needed by every program or device at every point in the execution flow. Thus to download and apply all the control parameters in the ACL may adversely affect performance and memory use. By using the presently disclosed technology to observe the actual pattern of use of the ACL's component control parameters it may be determined for each context switch from a source node to a target node of the aforementioned graph of execution flow which parameters are mandatory or most frequently used, and the downloading and application of the control parameters at the target node may be "trimmed" so that only those mandatory or most frequently used control parameters consume resources.

By acquiring knowledge of the aforementioned repeating patterns of control parameter use, various implementations of the presently disclosed technology may permit the system to provide the potential to achieve suitable processor performance, economy of memory use, detection of anomalies indicating potential problems (such as the presence of malware in the system), and optimization of processing flow between and among processes and devices. For clarity, the terms relating to context switches used in the present disclosure refer to any of the transitions made in the electronic system that may require changes in hardware or software configuration. Examples include transfers of control to a peer, client or server device, program function calls, remote procedure calls, hardware and software interrupts, and the like.

Implementations of the disclosed technology will now be described, by way of example only, with reference to the accompanying drawings, in which:

FIG. 3 shows an example directed graph, according to an embodiment.

Figure 1:
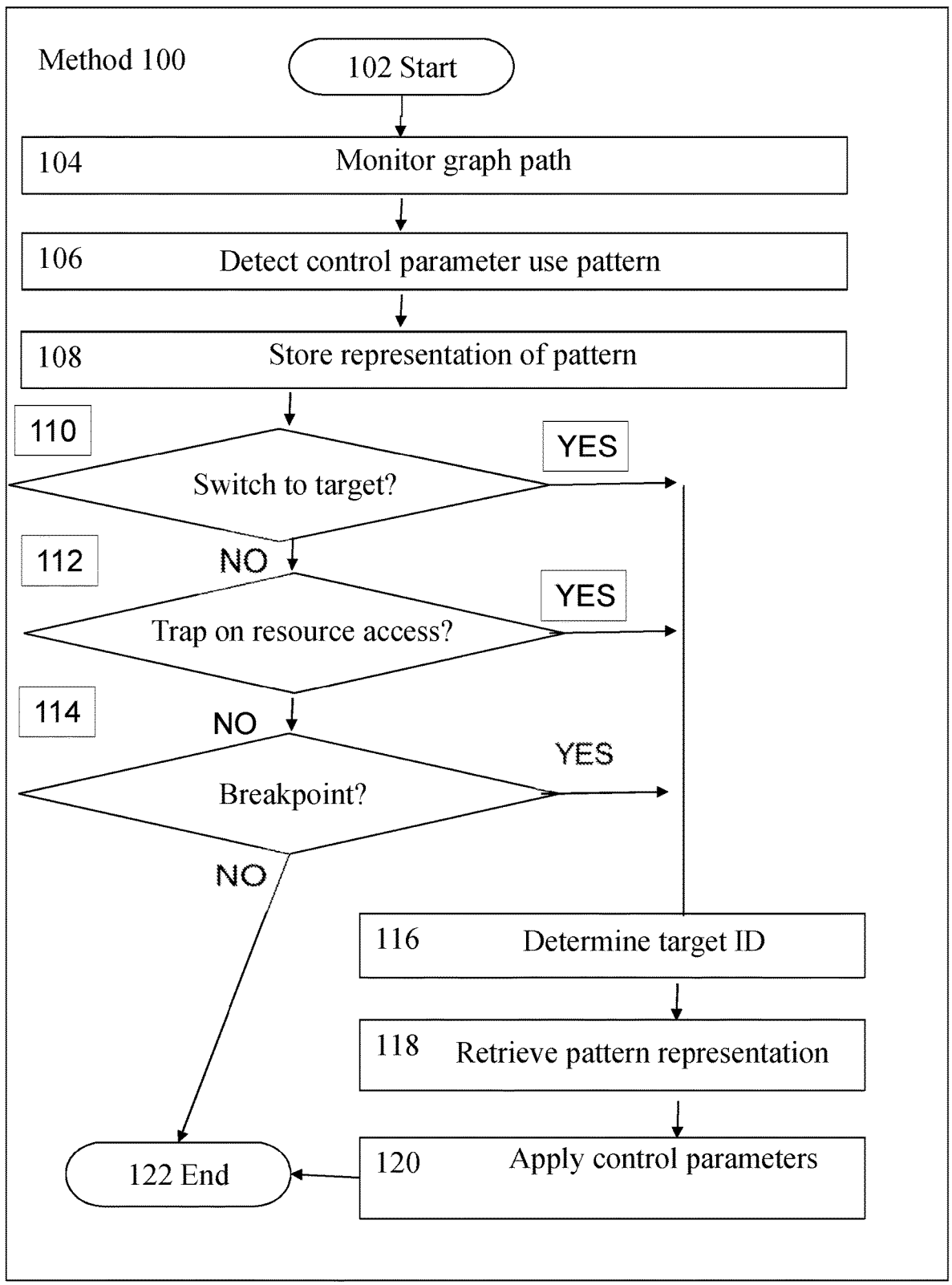
FIG. 1 shows an example of a method of operation according to the presently described technology.

In FIG. 1, there is shown method 100, which commences at Start step 102. As will be immediately clear to one of ordinary skill in the computing art, this may be the start of an iteration of the disclosed method, rather than a "cold" start. At step 104, a monitor is operated to detect in the graph path, at step 106, a pattern of use of control parameters by nodes in the graph, such as functions, interrupt procedures, or device resource accesses. At step 108, a representation of a detected pattern is stored. This may be, for example, a complete representation or a reduced representation, such as a cryptographic hash of the pattern, and the storage may be volatile or non-volatile. At test step 110, it is determined whether there has been an instruction to perform a context switch of the device or program that is currently in operation. If there has been no such context switch instruction, the process continues to test step 112, where it is determined whether there has been a trap or fault on access to a resource. If there has been no such trap or fault, the process continues to test step 114, where it is determined whether there has been a breakpoint in the process flow (for example, a debug breakpoint). If no such breakpoint has been detected, the process ends at End step 122 (which may, of course, be a return to Start step 102, when the technique is applied in an iterative manner).

If, at test steps 110, 112, 114, the outcome is positive as to the existence of a context switch, a trap or fault, or a breakpoint, the method proceeds to step 116, at which the target operating context is identified, and at step 118, the pattern of control parameter use that was previously stored in association with the target operational context identifier is retrieved from storage. At step 120, control parameters are applied in accordance with the identified pattern, and the process ends at End step 122 (which may, of course, be a return to Start step 102, in an iterative manner).

Figure 2:
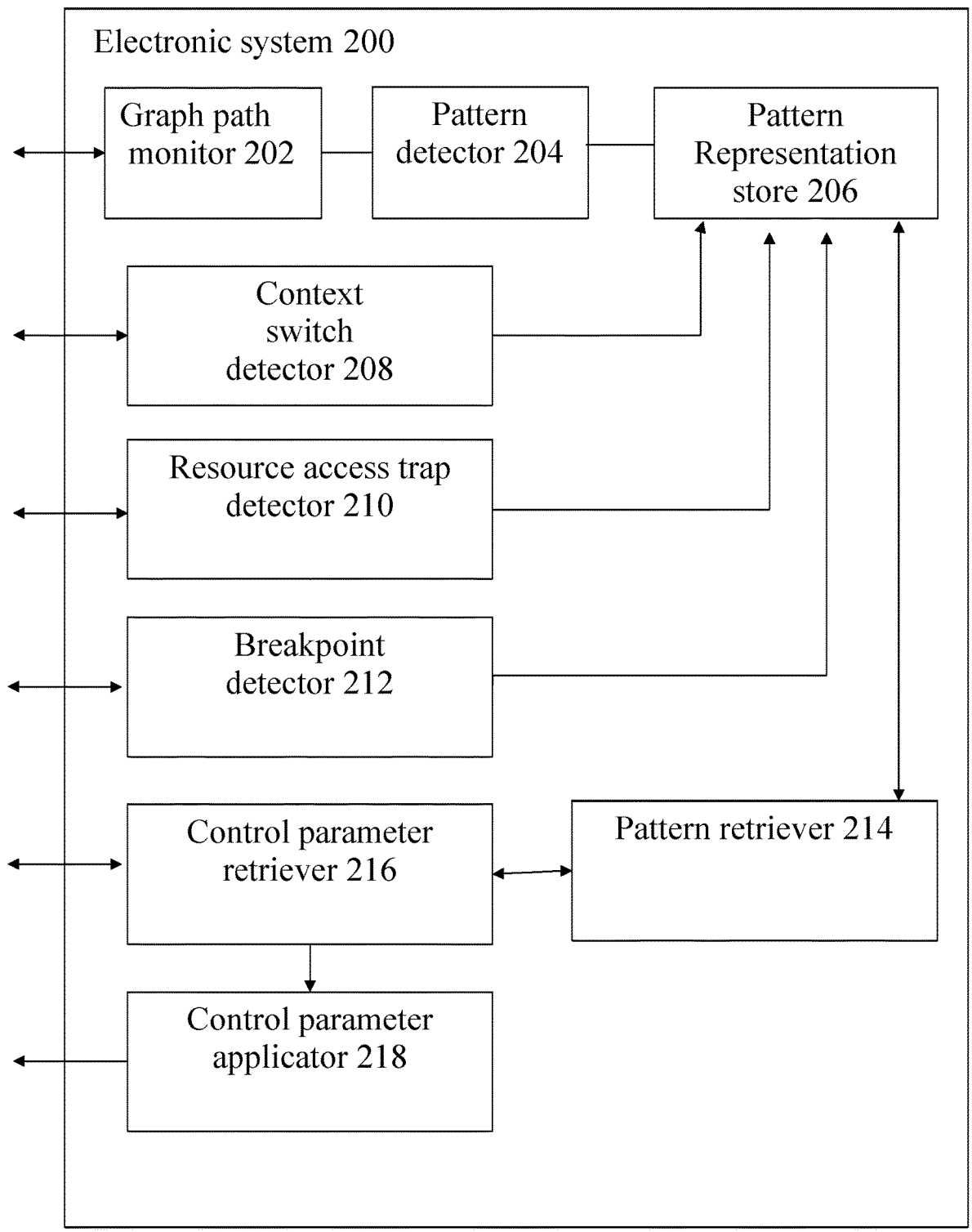
FIG. 2 shows an example of an electronic device operable according to the presently described technology.

In FIG. 2 is shown an electronic system according to one implementation of the present technology. Graph path monitor 202 is in electronic communication with a program or device to detect the path taken through a graph of operational context switches and to pass information about the use of control parameters by nodes in the path to pattern detector 204, which stores representations of detected patterns in pattern representation store 206. Context switch detector 208, resource access trap detector 210 and breakpoint detector 212 are in electronic communication with the program or device to detect, respectively, context switch instructions, resource access traps or faults, and breakpoints and to match identifiers of target operational contexts from pattern representation store 206. Pattern retriever 214 retrieves identified patterns and in turn retrieves the control parameters matching the pattern and passes them to control parameter applicator 218, which applies selected (and may ignore deselected) control parameters to the program or device.

The present technology is thus operable to compute, store, update and apply control parameters according to detected patterns across operational context switches, including, for example, electronic device reboots, local or remote function calls and program interrupts. The technology may apply internal and external analytics or heuristic methods to determine the parameters that are most likely to be needed. These methods include cases in which the patterns of use of control parameters are sent by a client device to be analysed by a server device or equivalent distributed system and cases in which they are computed and analysed on the device itself. If the analysis is conducted by a server or equivalent distributed system, the server or system may be operable to interrogate the client device to ascertain additional information about the patterns so as to refine the efficiency of the future operation of at least one electronic device. In a further refinement, a grid, mesh or cloud computing arrangement may be used to distribute the work of analysis among peer, client and server devices, according to resource availability.

Control parameter uses such as, for example, access control list (ACL) based security solutions, have the drawback that ACLs tend to grow with the application complexity. Applications with multiple software components typically have multiple control parameter lists, which inflates the number even further, thus reducing the manageability of control parameter application by individual nodes.

Many control parameters result in the application of hardware configurations at runtime—for example, Memory Protection Unit (MPU) configurations, interrupt ownership and priority levels, or similar hardware configurations. In a similar manner, software control parameters (such as local constant settings) determine the software configurations that apply in the contexts of the software execution flow. Different sets of parameters are applied when needed. When changing the execution context, the source and destination parameter sets need to be switched, and this can at times be prohibitively costly in resource consumption in resource-constrained devices.

The limited capabilities of MPUs (such as the limited number of memory regions available) are typically a bottleneck for the performance of these context switches. Often, a parameter list will be longer than the available number of regions, so that the operating system must decide in some manner which parameters to apply, typically on a first-come-first-served basis according to the typically non-optimal order of the stored control parameter data. If unused control parameters are downloaded and stored, this may be detrimental to the best use of memory resources. In addition, unapplied parameters must then be managed in an exception-based fashion, which is frequently detrimental to the performance of the electronic device.

The present technique provides a mechanism, typically at the device operating system level or in some higher-level server or distributed system, which analyses and computes the patterns for the application of control parameters. In an alternative, tooling according to the present technique may be associated with particular device drivers, or with one or more applications. During runtime, the need for the application of certain control parameters can be logged to determine the most likely needed ones or those that must be first or mandatorily applied, and to generate application patterns that are specific to the use of a software module or of a hardware device. The entire patterns may be stored in a storage device. In another implementation, a reduced representation, such as a mathematical transform, for example a hash (possibly a cryptographic hash) of the pattern, may be stored. One alternative is the storage of a mathematical transform consisting of pattern probabilities calculated using a modulo-arithmetical count technique to condense the potentially very large number of control parameter application patterns into a reduced number of probability buckets.

In one implementation, these patterns might be measured using heuristic methods by the subject device itself In other implementations, a server-side or distributed analysis tool may be used to log the control parameter accesses and report the metrics, or the outcome of their analysis, back to the device.

The device may compute control parameter application patterns for each software and hardware component, comprising at least (i.) the order of control parameter application, and (ii.) the corresponding hardware or software execution environment (context). In other implementations, the patterns might include metadata that describe the most favourable conditions in which to apply a given control parameter.

In one implementation, control parameters can be assigned timestamps that describe the time of application. Control parameters with similar timestamps can be grouped together and be assigned a single hash. Several control parameter groups will generate several hashes that can be represented as graphs in which the paths (edges) are weighted. Each weight represents the likelihood of the transition between two contexts having associated control parameter groups. The control parameter application scheme can then apply the individual control parameters in a control parameter group only when they are needed, based on these patterns.

In another implementation, control parameters can also be categorized according to their priority and frequency of occurrence. For example, control parameters that cover very rarely-used resources, such as infrequently-referenced registers, might be marked as passive, meaning that the operating system will never apply them actively. An exception may then be used to handle the passive control parameters if they are in fact needed, but at least no processing time or MPU region is wasted in the normal case according to the probabilities determined by the stored pattern. In another implementation, some control parameters might be marked as safety critical, meaning that they are always applied, for example, in contexts that require strict timing requirements, regardless of their frequency of use.

In another implementation, the control parameter use patterns can be tracked and stored at the granularity level of single functions. Each function can be annotated at runtime with the sets of control parameters that did or did not trigger an access fault. The execution of successive functions would generate an execution stream in which each function represents a node of a graph, with each path between nodes representing an operational context switch.

In one implementation in which function calls represent the main cause of context switches, for each node in the graph, a function-call-stack-entry-specific hash may be generated and stored in a hash table. Thus the execution flow associates the pattern of control parameter use with each of the entries in the call stack. The stored hashes represent the execution flow (the order of function calls) and the associated set of control parameters that were needed for each node in the graph representing the execution flow. In one implementation, the call-stack-specific node hashes can be associated with Bloom filters, which, given a hash, are able to determine whether a control parameter pattern belongs to a node. This technique is efficient at performing a runtime check to determine whether a pattern has been observed before. If the pattern has been observed before, the hash table provides the list of best control parameters to apply. If the pattern has not been observed before, a fall-back approach may be used, such as a simple round-robin, a least-recently-used technique or a first-come-first-served approach to applying the control parameters.

Figure 3:
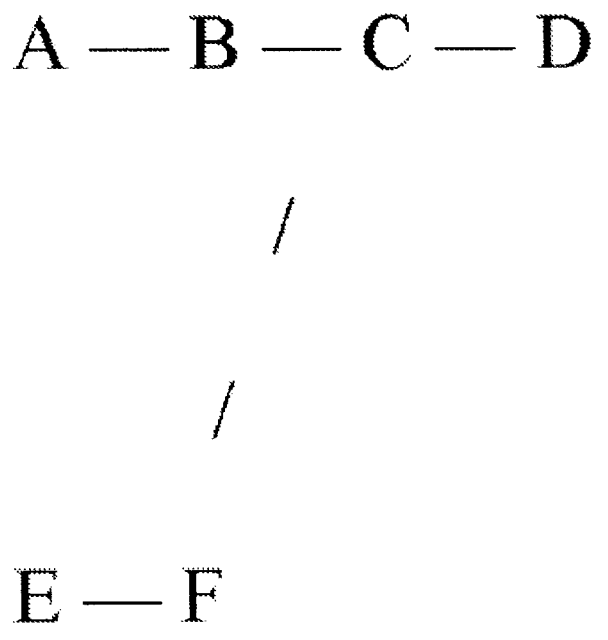

In the implementation of the Bloom filter, the hash table can either contain (i.) the hash of the whole pattern or (ii.) the hash of all the sub-patterns. In this way, different levels of granularity can be exploited (a single function, group of functions, a whole execution flow). An example directed graph is depicted in FIG. 3.

Assuming that execution time flows from left to right, all the possible sub-patterns are A, A-B, A-B-C, A-B-C-D, E, E-F, E-F-C, E-F-C-D. In one implementation the technique could fingerprint the pattern at the nodes A, E, C, D, generating the patterns, A-B-C, A-B-C-D, E-F-C, E-F-C-D. In this way, the mutating patterns of control parameter use at each node can be stored in association with the identifier of the target node of each context switch for retrieval at a subsequent instance of a context switch from the same source to the same target.

In such an implementation, in the presence of inter-process or inter-program communication, the control parameter annotations stored for each node can be further extended to include other performance-critical metadata, such as metadata that can speed-up message delivery and context switching; for example, information about a call sequence originating from interrupt requests or peripheral device operations.

In another implementation, a special version of a Bloom filter can be used, which is called a weighted Bloom filter. The same control parameter pattern, resulting in the same hash, can be repetitively inserted in the hash table. Each time a hash is inserted, a counter (weight) is increased. In this way the Bloom filter can return probabilistic results that are weighted according to the likelihood of a pattern to occur and its frequency of occurrence at any node in the execution flow graph.

In one refinement of the technology, it is possible to pre-emptively prepare for a later node in the graph when resources available at an earlier node permit. For example, if, in an execution flow A->B->C->D->E, node E generates a fault requiring UART0 (Universal Asynchronous Receiver/Transmitter 0), with the disclosed pattern-based technology it is possible on a subsequent instance of the flow to "hint" the need of UART0 to all the nodes that are probably leading up to E, but with lower priorities. Thus, node A would be instructed to apply the control parameter to configure UART0 art 10% priority, B at 15%, and so on. At node E, the priority is 100%. In this implementation, if there are spare resources, such as memory regions, at an earlier node, say, node C, UART0 may be configured there, without waiting for node E to trigger.

This can be achieved by keeping the stack of target node identifier/pattern data in memory of the given call stack (which has the advantage of low overhead and a typically capped maximum depth) and then annotating all the control parameters for each node in the stack with decreasing priorities (either by use of the aforementioned weighted Bloom filter, or by application of any other method of setting probabilistic weights for annotating target IDs).

In a further refinement, an additional annotation to each of the stored patterns may be used to distinguish a pattern of control parameter use in one thread from a similar, but not identical, pattern of control parameter use in a different thread. For example, thread 1 uses the printf function specifying UART0 as the destination at a particular node, and thus the stored pattern would normally indicate to further instances of the flow that UART0 should be configured at a high priority. However, thread 2 uses the printf function specifying UART1 as the destination at the matching node in its instance of the graphed execution flow, and thus configuring UART0 would be wasteful. This may be avoided by annotating the patterns with the thread identifiers to provide additional precision in the implementation of the described technology.

In the call-stack implementation, it is further possible to refine the technology by annotating or seeding the control parameter patterns with the return address of the call, as well as the target function address. By doing this, multiple separate calls to the same function that mutate the pattern forward through the flow will be individually identifiable and distinguishable from iterative calls to the same function executed in a loop.

Further, once the described technology has been implemented, it is possible to accept user inputs to the described method for annotating the patterns. User commands may be used to override the method to modify the pattern based on user observation, where the "user" may be a human user, such as an end-user, a system programmer, or an administrator, but equally may be a user program, procedure or device. For example, an intelligent monitoring program at a server device may be able to correlate the information from many devices and programs to improve the efficiency of control parameter use at one or more devices, whereas a single device may have too-limited processor or memory resources to perform the requisite complex analysis of the patterns.

In case of inbound remote procedure calls or inter-program or inter-process calls the origin of the call and the remote call stack might be used to further improve the precision of the control parameter prediction. The Bloom filters may be control parameter-specific, meaning that at each node each control parameter is compared against the available information regarding the control parameter occurrence. This approach could also be implemented with a threshold, so that a minimum frequency is required before a control parameter is applied to the electronic system. More generally, patterns may be categorized into probability buckets.

Once the pattern is computed, it can be stored in flash or in a similar storage and protected in the same manner as any other private memory resource. In one implementation, key-value storage arrangement can be used to access and update subsequent control parameter use patterns once newer metrics are computed.

Upon reboot or another operation context switch, the operating system can fetch the stored control parameter patterns and use them in place of the default ones typically provided by the device or program itself in a flat form, or in place of the previous patterns stored in an older entry of the key-value storage.

In another implementation, even if the patterns are not actively stored in any non-volatile storage, they can still be stored in volatile memory and used at runtime. Since the level of the granularity can be fairly high (e.g., at function level), annotations as described above can still be used in the process to detect and apply recurring patterns even in the same power cycle.

In another implementation, a group of "Internet of Things" (IoT) devices can operate the same method of pattern analysis and storage but in a pseudo-random way by suspending the application of some control parameters to the device or program temporarily, so that different patterns can be analysed for their efficiency and then shared across the network in a distributed way. The entire group of devices may thus gain shared knowledge of the most effective and efficient patterns to apply at various points in the execution flow. A centralized service may collect these patterns and reconcile them into a single set, depending on the individual analysis. This service may also be designed to request refined measurements from certain paths through the graph of the execution flow in case of inconclusive measurements.

The statistics about the occurrence of any given pattern can also be used to trade off performance against power consumption. A pattern can be either applied or ignored based on the probability of a pattern's occurrence balanced against the resource cost of enforcing its control parameters.

The use of recognized patterns may increase the performance of the context switches and in general of the application of control parameters. In addition, the operating system will be less frequently required to recover from exceptions caused by an incorrectly or sub-optimally disabled control parameter that could have been retained in force from an earlier node in the execution flow graph.

In one implementation, the step of applying at least one control parameter may comprise applying only selected ones of the plural control parameters to match the pattern, and by implication not applying deselected ones of the plural control parameters to match the pattern.

The step of applying at least one control parameter may comprise applying at least selected ones of the plural control parameters according to a time order of use to match the pattern. In another implementation, the step of applying at least one control parameter may comprise applying at least selected ones of the plural control parameters according to a priority order derived from the pattern.

The step of detecting a pattern of use of control parameters may comprise detecting a pattern of use of at least one of access control list parameters, memory management parameters, cache management parameters, interprocess communication parameters, remote procedure call parameters, and local function call parameters.

The step of storing a representation may comprise storing at least one of an entire pattern and a mathematical transform, such as a hash (cryptographic or otherwise), of the pattern. The step of detecting a pattern of use of plural control parameters in a path through a graph of operational context switches may comprise detecting the pattern in a path through a graph of at least one of: a system reboot, a function call, a procedure call, and a software or hardware interrupt.

In a refinement of the technology, the representation of the pattern may be seeded or annotated with a process or thread identifier distinguishing the pattern as detected in a first thread or process from a pattern detected in a further thread or process.

The technology herein disclosed may further comprise accumulating multiple patterns at a server device or distributed processing system, and analysing the patterns for probability of occurrence at at least one node. The outcome of the analysis may then be distributed for use by a number of electronic devices. The server or distributed system may also interrogate one or more electronic devices to acquire additional data for one or more of the patterns, so as to take advantage of the multiplicity of results obtained from the devices to improve their individual operational efficiency.

In one implementation the patterns may be used to assist in detecting an anomalous pattern of control parameter use as compared with a stored pattern and emitting an alert signal to indicate that there may be an error or that malware may be interfering with the normal operation of one or more of the electronic devices. The technique may also accept external input (such as input from a human or external automated system) to add or modify context-specific data to a pattern. In addition, the method may be adapted to add address data to said pattern distinguishing iterative calls from non-iterative calls. In this way, resources, such as memory space, are not unnecessarily consumed by pattern data generated by loops in a program's execution flow.

Once a path through the graph of operational context switches has been analysed, it can, in a further refinement, be used to predict which control parameter settings, such as memory allocations, can or should be applied and retained by an earlier node in a flow through the graph to achieve improved performance later in the most likely following path. In addition, if a number of devices or programs have very well established patterns of control parameter use, the optimisations may be pre-installed or downloaded from a central source with the device operating system, other firmware or a particular application program or group of programs.

As will be appreciated by one skilled in the art, the present technique may be embodied as a system, method or computer program product. Accordingly, the present technique may take the form of an entirely hardware embodiment, an entirely software embodiment, or an embodiment combining software and hardware.

Furthermore, the present technique may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine implemented method for operating at least one electronic system, comprising:
    detecting a pattern of use of plural control parameters in a path through a graph of operational context switches to reach a target operational context;
    storing a representation of said pattern in association with an indicator identifying said target operational context;
    responsive to detecting at least one of a request for a switch of operation from a source operational context to said target operational context, a trapping on a resource access, and a detection of a breakpoint, retrieving said representation in accordance with said indicator identifying said target operational context; and
    responsive to said retrieving, applying selected ones of said plural control parameters according to a time order of use to match said pattern.

2. The machine implemented method of claim 1, wherein said step of applying comprises applying selected ones of said plural control parameters according to a priority order derived from said pattern.

3. The machine implemented method of claim 1, wherein said step of detecting a pattern of use of control parameters comprises detecting a pattern of use of at least one of: access control list parameters, memory management parameters, cache management parameters, interprocess communication parameters, remote procedure call parameters, and local function call parameters.

4. The machine implemented method of claim 1, wherein said step of storing a representation comprises storing at least one of an entire said pattern and a mathematical transform of said pattern.

5. The machine implemented method of claim 4, wherein said mathematical transform of said pattern is a hash.

6. The machine implemented method of claim 1, wherein said step of detecting a pattern of use of plural control parameters in a path through a graph of operational context switches comprises detecting said pattern in a path through a graph comprising at least one of: a system reboot, a function call, a procedure call, and a program interrupt.

7. The machine implemented method of claim 1, further comprising seeding said representation of said pattern with at least one of a thread identifier distinguishing a first said pattern as detected in a first thread from a further said pattern detected in a further thread and a process identifier distinguishing a first said pattern as detected in a first process from a further said pattern detected in a further process.

8. The machine implemented method of claim 1, further comprising detecting an anomalous pattern of control parameter use as compared with a stored pattern and emitting an alert signal.

9. The machine implemented method of claim 1, further comprising accepting external input to add context-specific data to at least one said pattern.

10. The machine implemented method of claim 1, further comprising adding return address data to said pattern distinguishing iterative calls from non-iterative calls.

11. The machine implemented method of claim 1, further comprising:
    accumulating multiple said patterns at at least one of a server device and a distributed processing system; and
    analysing said patterns for probability of occurrence at at least one node.

12. The machine implemented method of claim 11, further comprising distributing an outcome of said pattern analysis to said at least one electronic device and to at least one further electronic device.

13. The machine implemented method of claim 11, further comprising interrogating one or more said electronic devices by said at least one of a server device and a distributed processing system to acquire additional data for at least one said pattern.

14. An electronic control device comprising logic apparatus for operating at least one electronic system, comprising:
    a detector for detecting a pattern of use of plural control parameters in a path through a graph of operational context switches to reach a target operational context;
    a store for storing a representation of said pattern in association with an indicator identifying said target operational context;
    a retriever, responsive to said detector detecting at least one of a request for a switch of operation from a source operational context to said target operational context, a trapping on a resource access, and a detection of a breakpoint, for retrieving said representation in accordance with said indicator identifying said target operational context; and an applicator, responsive to said retrieving, for applying selected ones of said plural control parameters according to a time order of use to match said pattern.

15. A computer program product stored on a non-transitory computer-readable medium comprising computer program code to, when loaded into a computer system, cause said system to perform:

detecting a pattern of use of plural control parameters in a path through a graph of operational context switches to reach a target operational context storing a representation of said pattern in association with an indicator identifying said target operational context;

responsive to detecting at least one of a request for a switch of operation from a source operational context to said target operational context, a trapping on a resource access, and a detection of a breakpoint, retrieving said representation in accordance with said indicator identifying said target operational context and responsive to said retrieving, applying selected ones of said plural control parameters according to a time order of use to match said pattern.

\* \* \* \* \*